United States Patent [19]
Dunn

[11] Patent Number: 5,841,848
[45] Date of Patent: Nov. 24, 1998

[54] SYSTEM AND METHOD FOR COMPLETING TELEPHONE CALLS TO EMERGENCY TELEPHONE NUMBERS IN HIGHLY CONCENTRATED ACCESS SYSTEMS

[75] Inventor: James Patrick Dunn, Sandwich, Ill.

[73] Assignee: Lucent Technologies Inc., Murray Hill, N.J.

[21] Appl. No.: 646,445

[22] Filed: May 7, 1996

[51] Int. Cl.[6] .......................... H04M 15/00; H04M 11/04
[52] U.S. Cl. .............................. 379/128; 379/45; 379/48; 379/113; 379/209
[58] Field of Search .............................. 379/45, 113, 134, 379/137, 138, 139, 201, 207, 209, 216, 221, 48

[56] References Cited

U.S. PATENT DOCUMENTS

| | | | |
|---|---|---|---|
| 4,839,892 | 6/1989 | Sasaki | 379/45 |
| 5,295,183 | 3/1994 | Langlois et al. | 379/113 |
| 5,425,091 | 6/1995 | Josephs | 379/201 |
| 5,596,625 | 1/1997 | Leblanc | 379/45 |
| 5,692,033 | 11/1997 | Farris | 379/209 |

*Primary Examiner*—Paul Loomis
*Attorney, Agent, or Firm*—Michael B. Johannesen

[57] ABSTRACT

Disclosed is a system and method which screens all telephone call originations on an access system for calls to emergency services during times of telephone system congestion and bases a decision as to how to handle the call on such determination. According to this invention, all access system call originations (including dialed digits) are delivered to the switching system. If the access facilities are in an overload condition due to high volume or equipment failure, the switching system makes a predetermination as to whether the digits dialed indicate a call for emergency services (a 911 call) or a regular telephone call. Calls for emergency services are immediately routed. Regular telephone calls are advantageously routed to an announcement which announces traffic congestion and disconnects the call, thus providing access facilities for additional emergency calls. Advantageously, the switch stores the calling and called number for the purpose of completing the call after the congestion condition has cleared.

5 Claims, 2 Drawing Sheets

SYSTEM AND METHOD FOR COMPLETING TELEPHONE CALLS TO EMERGENCY TELEPHONE NUMBERS IN HIGHLY CONCENTRATED ACCESS SYSTEMS

TECHNICAL FIELD

This invention relates to the field of highly concentrated telephone access systems and, more specifically, to providing emergency service during times of congestion in such highly concentrated access systems.

BACKGROUND OF THE INVENTION

In this so-called "information age," there is a greater demand more telephone service than ever before. For example, most businesses and many consumers have several voice telephone lines, a telephone line for one or more fax machines and telephone lines for one or more computer systems. This increased demand for customer lines has, in turn, caused telephone operating companies to demand telephone equipment that can handle the increased load without greatly increasing the cost of the physical plant of the switching network.

In the past, almost all telephone lines were connected directly to a facility at the telephone switching system ("switch"). A switch is a network element that generally has processing capability which can detect and correct problems encountered in day-to-day operations. However, telephone operating companies are becoming more and more decentralized by using subscriber loop carriers (SLCs) and other types of remote terminals and transmission facilities outside of the switching office to provide telephone access to the switching office. Such facilities, generally referred to as "access facilities," do not have local control; they are dependent upon the network element (usually a switch) to which they are connected for operational control.

However, even given the high demand for telephone services, it is well-known that most telephone lines are not in use at any given time. Therefore, starting in the early years of automatic telephone office switching equipment, there is a degree of concentration on the access side of a switch. For example, for every X number of lines (where X is usually between 4 and 8) there is one facility available for connecting one of those lines through the switching network. Such design choices were usually dictated by demand for service and how frequently each line was used, all of which are measurable, tunable parameters. Recently, more and more access facilities are being located outside the switching office (in remote terminals such as subscriber loop carriers or "SLCs"), and concentration is further increased by the number of channels available between the switching office and the remote terminal. Further, there are now even line concentration units at the remote terminal.

Such highly concentrated access systems may cause congestion in the system for two primary reasons. First, there may be congestion of the system when many of the lines are in use, which occurs, for example, during times of local problems or disasters, such as fires, and even times where radio stations or television stations hold promotions. Secondly, equipment failure anywhere along the transmission path between the remote terminal and the switching office may permit only a limited number of lines to receive service.

Currently, if a user on a highly concentrated access facility attempts to place a telephone call during a period of congestion (either due to call volume or equipment failure), either the user's call is placed in a queue for dialtone (delayed dialtone); or, in extreme cases, the user does not receive dialtone at all. If the user needs to place an emergency call (usually referred to as a "911" call), neither of these alternatives is acceptable. However, there can be no differentiation between emergency calls and any other call upon origination in access facilities, because there is no processing capability to differentiate one type of call from another.

Therefore, the problem in the art is that there is a need for a telephone switching system that can originate and complete emergency calls during traffic congestion caused by heavy volume or by equipment failure in an access network.

SUMMARY OF THE INVENTION

This problem is solved and a technical advance is achieved in the art by a system and method wherein a switch screens all call originations from access facilities for emergency calls during times of access congestion and bases a decision as to how to handle the call on the results of such screening. According to this invention, all call originations from an access system (which, in an access network, includes dialed digits) are delivered to the switching system on a signaling channel. If the access facilities are in an overload condition due to high volume or equipment failure, the switching system makes a predetermination as to whether the dialed digits indicate a call for emergency services (a 911 call) or a regular telephone call. Calls for emergency services are immediately routed to the next available network facility. Regular telephone calls are routed to an announcement which gives a brief announcement regarding access congestion and disconnects the call, thus freeing access facilities for emergency calls. Advantageously, the switch stores the calling and called number of non-emergency calls for the purpose of completing the call after the congestion condition has cleared, or notifying the calling party that call restrictions are no longer in effect.

BRIEF DESCRIPTION OF THE DRAWING

A more complete understanding of the invention may be obtained from consideration of the following description, in conjunction with the drawings, in which.

DETAILED DESCRIPTION

Figure 1:
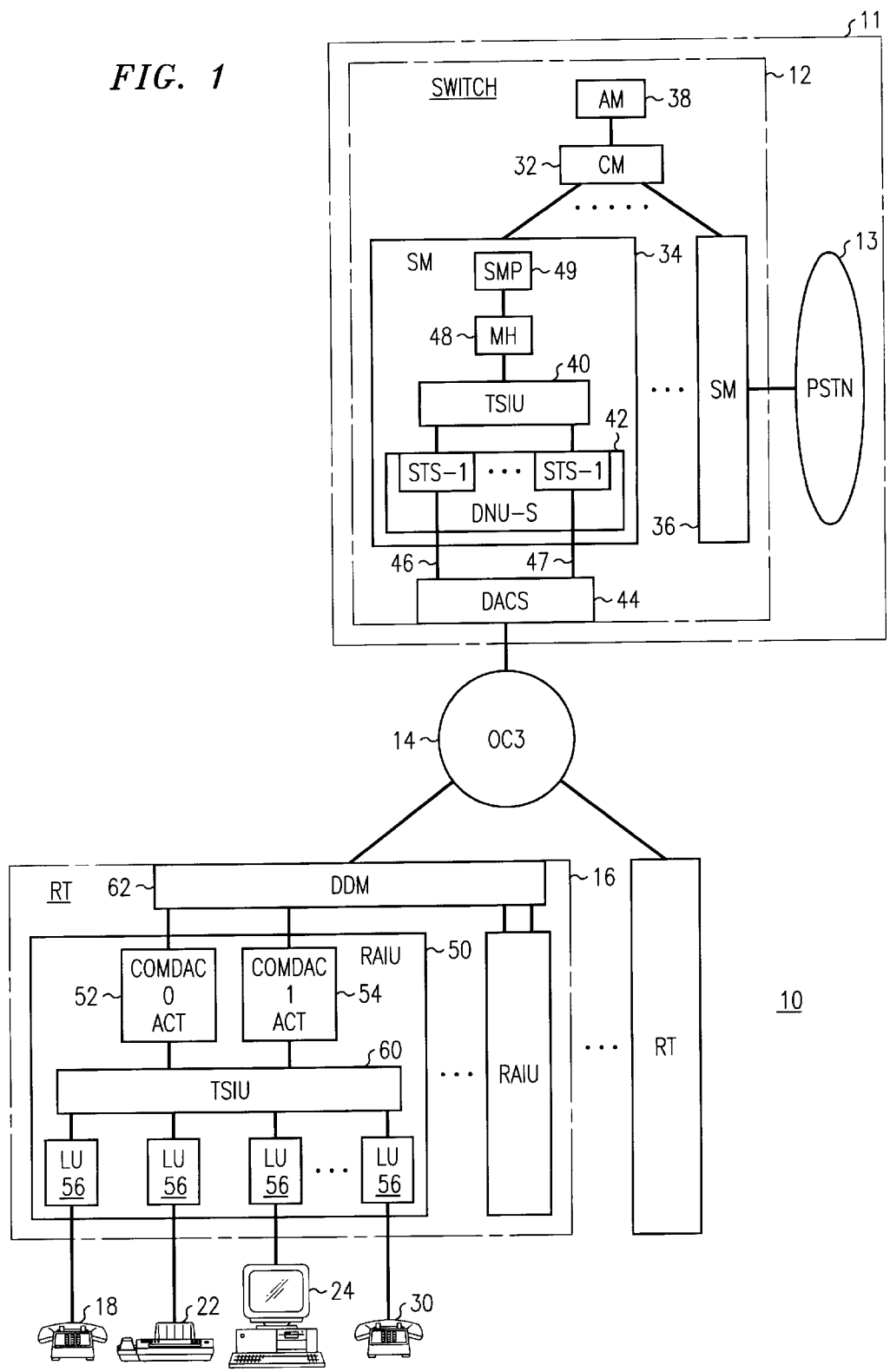
FIG. 1 is an illustration of a typical, highly-concentrated remote terminal and switching office facility.

An exemplary embodiment of a system and method for providing protection for emergency calls in a highly concentrated access system is described herein in the context of a digital loop carrier system 10 connected to a switching network 11, as illustrated in FIG. 1, the switching network comprises a central office switch 12 connected to the public switched telephone network (PSTN) 13. The access system comprises transmission facilities 14, and one or more remote terminals 16. Remote terminal 16 is connected to a plurality of telephones, as illustrated by 18 and 30, fax machines, as illustrated by 22, and computers, as illustrated by computer 24. Many more telephones and other units may be connected to remote terminal 16, as is known in the art. However, these units are shown for illustration purposes.

Switch 12 is, illustratively, a distributed control telephone switching system such as the system disclosed in U.S. Pat. No. 4,592,048, issued to N. W. Becker, et al., on May 27, 1996. Alternatively, switch 12 may be a distributed control digital switch such as a 5ESS® switch manufactured by Lucent Technologies Inc., and described in the AT&T Technical Journal, volume 64, No. 6, July/August, 1995, pages 1303–1564. The architecture of switch 12 includes communication module (CM) 32 as a hub, with switching module (SM) 34 and other switching modules 36 as an illustration (there would be many other switching modules in actual application), and administrative module (AM) 38 emanate therefrom. SMs 34 and 36 terminate analog and/or digital subscriber lines and trunks through line units and trunk units as known in the art. AM 38 provides coordination of functional components of switch 12 and provides a human/machine interface. SM 34 includes a timeslot interchange unit (TSIU) 40. TSIU 40 is connected to the plurality of line and trunk units, including the illustrated DNU-S 42. TSIU 40 is also connected to message handler (MH) 48, which is, in turn connected to switch module processor (SMP) 49. DNU-S 42 is connected to a digital access cross connect system (DACS) 44 via a plurality of STSs (SONET facilities) illustrated by 46 and 47, which carry a plurality of telephone calls or other digital communications in time slots, as is known in the art.

DACS 44 receives data from transmission carrier 14, which in this exemplary embodiment is an optical carrier type 3 (OC 3) ring (a Sonnet facility). OC 3 ring connects switching office 12 with a plurality of remote terminals 16 (only one is shown for clarity) using standard Sonnet OC 3 communications protocol, as known in the art. Alternatively, DS1 facilities or OC 48 communications protocol may be used, or, in international applications, an STM ring or ETSI facilities, as known in the art. provides the same functionality.

Remote terminal comprises a remote access interface unit (RAIU) 50. Alternatively, RAIU could be any type or manufacturer that supports per-call channel management via a standard such as TR303 (or a proprietary protocol). RAIU includes two command and data control (COMDACs) units 52 and 54, which, in this exemplary embodiment, are in dual active configuration. Comdacs 52 and 54 connect a digital data multiplexer (DDM) 62 to RAIU 50. DDM 62 provides an interface and multiplexing/demultiplexing function between OC 3 14 and RAIU 50. Telephones and other units 18–30 are connected to RAIU through a plurality of analog line units 56, as known in the art, which are, in turn, connected to timeslot interchange unit (TSIU) 60 in order to multiplex call appearances from individual line units. TSIU 60 is connected to DDM 62 by COMDACs 0 and 1, 52 and 54 respectively, via DS1s. Such COMDACs 52,54 are generally used in active/active mode to permit a greater number of accesses to switch 12. As illustrated, there may be more than one RAIU 50 connected to DDM62.

Switch 12 is used to control RT 50 via a control channel on one of the DS1s to perform call processing as is known in the art. When a customer goes offhook, line unit 56 at RAIU 50 reports the offhook condition to the switch via such control channel. The switch determines which voice channel is to be used for this call and returns the information to remote terminal 50. RAIU 50 then makes a connection through its internal fabric (TSI 60) connecting the offhook line to the DS1 channel specified by switch 12, which connects the call through COMDAC 0 or 1 DDM62 OC314 to the switch 12. Switch 12 then proceeds with call processing functionality, such as routing the call. If on-hook is detected at the calling party line, remote terminal 16 alerts the switch of the onhook via the control channel, and the switch will tear down the call. If the far end hangs up first, the switch notifies the remote terminal 50 to release the connection for the line to the DS1 and channel specified.

Because the switch can instruct the remote terminal to connect any DS0 within DS1s, it is possible to provide a highly-efficient concentration at remote terminal 16. In normal operation, this concentration is seldomly noticed by the customer; however, when a critical failure occurs in the remote terminal 16 or transport facility 14, with its multiplexers and demultiplexers 44 and 62, blocking greatly increases for all calls. On the other hand, it has become increasingly important to the telephone operating companies that calls to emergency numbers (i.e., 911) be completed; telephone companies are sometimes liable for not being able to complete such calls. Therefore, in a highly concentrated network such as 10, a new capability is required in order to permit emergency calls during times of congestion such as equipment failure or maximum or near capacity use.

According to this invention, a predetermined number of channels are reserved for completion of emergency calls during times when congestion is at a maximum. This number of reserved channels may be determined based on tunable field parameters. Since switch 12 keeps track of how many DS0s are available for completion of calls, it can determine when it is approaching a time of maximum congestion. When switch 12 determines that it is in a congested period, it screens calls for calls to emergency numbers, such as 911. All originations from remote terminal 50 (and other remote terminals) are handled in the normal fashion; however, according to this invention, a predetermination is made for the received digits if the call is to 911 (or any other emergency number). Such preserving of calls is new in the art, as digit analysis is performed at a later stage in normal call processing. If only the reserved channels are idle, the switch 12 rejects any calls that are not made to the emergency number. Also, incoming calls to the remote terminal 50 will be rejected. In handling these rejections, it is advantageous that a short announcement is played and then the call is disconnected. This prevents channels that switch 12 may be needed for emergency calling from being occupied by repeated attempts to place non-emergency calls. This is a departure from the art, in that normally calls during periods of congestion are queued for dialtone at the switch, and may have to wait for several minutes (or longer) before being allowed to dial. Advantageously, calls originating from remote terminal 50 or from PSTN, which are not emergency related, may be queued at switch module 34 for later call back when the congestion has been alleviated. In this manner, emergency calls may still be completed during times of maximum congestion and service may be provided when service has been restored.

Figure 2:
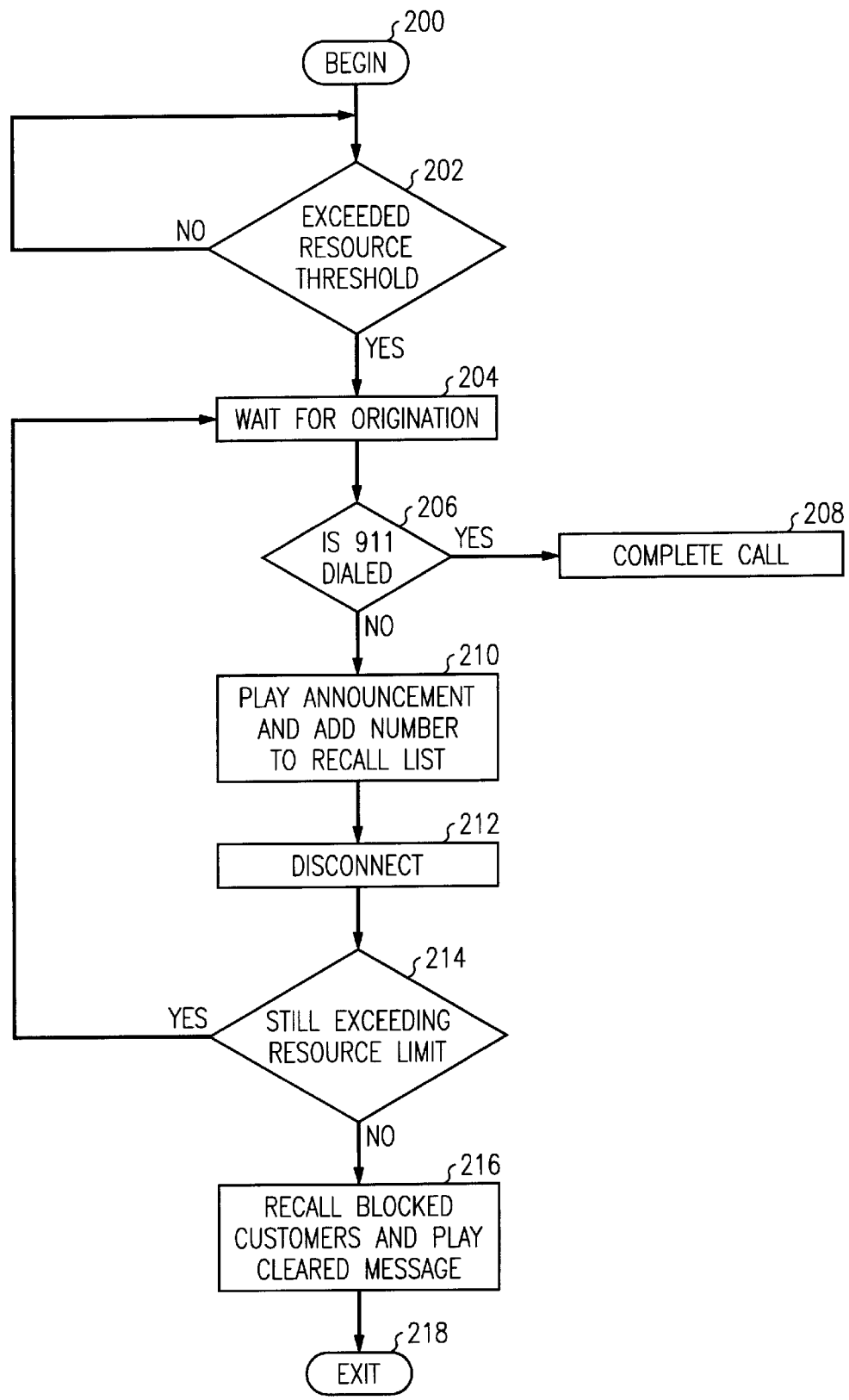
FIG. 2 is a flow chart of the actions performed in the switching office according to this invention.

Turning now to FIG. 2, a flow chart of a procedure at switch 12 is determined. Processing begins at 200 and proceeds to decision diamond 202, where a determination is made whether the resource threshold has been exceeded. If it is not, then normal call processing is continued and periodically the resource threshold is checked. If, in decision diamond 202 the resource threshold has been exceeded, then switch 12 waits for an origination in action box 204. When switch 12 receives an origination, it determines whether an emergency call number (for example, 911) has been received, in decision diamond 206. If an emergency call number has been dialed, then the call is completed to the emergency action interface point in box 208.

If, in decision diamond 206, the call is not for the emergency number, then, in action box 210, an announcement is played to the customer and, optionally, the customer is added to the recall list. Next, in action box 212, the call is disconnected in order to free up resources. Processing proceeds to decision diamond 214, where a determination is made if the resource limit is being exceeded. If so, then processing returns to action box 204. If resource threshold is not exceeded in decision diamond 214, then processing proceeds to action box 216, where the customers trying to place calls are called back and a message is played which informs them of the cleared state and optionally the call is then completed. Processing ends at circle 218.

It is to be understood that the above-described embodiment is merely an illustrative principle of the invention and that many variations may be devised by those skilled in the art without departing from the scope of this invention. It is, therefore, intended that such variations be included within the scope of the claims.

I claim:

1. A method for handling telephone calls during periods of telephone access congestion, said telephone access congestion comprising a predetermined utilization level of telephone access facilities, wherein a predetermined number of said telephone access facilities are reserved for emergency calls, said method comprising the steps of:

receiving from a caller a selection of a destination telephone number;

determining from said destination telephone number selection and exclusive of other interaction with said caller whether a telephone call is for an emergency number;

responsive to a determination that said call is for an emergency number, routing said call to said emergency number on one of said reserved telephone access facilities; and responsive to a determination that said call is not for an emergency number, routing said call to announcement and disconnecting said call in order to free telephone access facilities occupied by said call.

2. A method in accordance with claim 1 wherein said step of determining whether a telephone call is for an emergency number comprises performing digit analysis in central office equipment as a first step in call processing.

3. A method in accordance with claim 1 further comprising the step of recording the calling identification of the call for retrieval after the period of telephone access congestion.

4. A method in accordance with claim 3 further comprising the steps of:

responsive to determining that said access congestion has cleared, completing a call to said calling party and inquiring whether the call should now be completed.

5. A method in accordance with claim 3 further comprising the step of:

responsive to determining that said access congestion has cleared, completing said call to both the called and the calling party.

* * * * *